United States Patent Office 3,350,402
Patented Oct. 31, 1967

3,350,402
ACYL DERIVATIVES OF 1-AMINO-4-XANTHENYLPIPERAZINE
John W. Cusic, Skokie, and Peter Yonan, Chicago, Ill., assignors to G. D. Searle & Co., Chicago, Ill., a corporation of Delaware
No Drawing. Filed May 18, 1966, Ser. No. 550,943
6 Claims. (Cl. 260—268)

The present invention relates to compounds which are hydrazides of N-aminopiperazines containing the xanthene or thioxanthene structure. In particular, the present invention relates to compounds having the following general formula

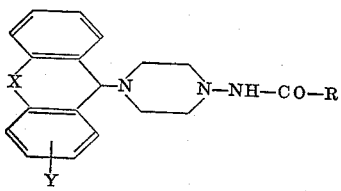

wherein X is selected from the group consisting of O and S; Y is selected from the group consisting of hydrogen, methyl, and halogen; R is selected from the group consisting of lower alkyl, cyclohexyl, phenyl, and substituted phenyl.

The halogen radicals referred to above include fluorine, chlorine, bromine, and iodine. The lower alkyl radicals referred to above contain up to 6 carbon atoms and can be illustrated by radicals such as methyl, ethyl, propyl, butyl, and hexyl. When R is substituted phenyl, the substituents include methyl, halogen, methoxy, trifluoromethyl, amino, and the like. Under these circumstances, R would be groups such as tolyl, fluorophenyl, chlorophenyl, methoxyphenyl, trifluoromethylphenyl, and aminophenyl.

The compounds of this invention are useful because of their pharmacological properties. In particular, they are useful as anti-ulcer agents; this activity is demonstrated by their inhibition of ulceration in the Shay rat. They also possess anti-inflammatory activity which is demonstrated by their phenylbutazone-like effect on edematous conditions. These activities of the present compounds are not accompanied by antibiotic activity.

The compounds of the present invention are conveniently prepared by the reaction of a 4-substituted 1-aminopiperazine with an acylating agent. Thus, the appropriate acid halide, preferably the chloride, or an acid anhydride can be used in the acylation procedure. In addition, special acylating agents such as isatoic anhydride can be used to prepare the desired hydrazides of the present application.

The following examples are presented to further illustrate the present invention; they should not be construed as limiting it in spirit or in scope. In these examples, quantities are indicated in parts by weight and temperature in degrees centigrade (° C.).

Example 1

A solution of 4 parts of acetic anhydride in 30 parts of chloroform is added to a solution of 5 parts of 1-amino-4-(9-xanthenyl)piperazine and 10 parts of triethylamine in 120 parts of chloroform. The resultant mixture is refluxed with stirring for 2.5 hours and then cooled. The mixture is then washed with water and dried and the solvent is evaporated under reduced pressure to leave a residual solid. This solid is recrystallized from a mixture of chloroform and ether to give 1-acetamido-4-(9-xanthenyl)piperazine melting at about 239–241° C. This compound has the following formula

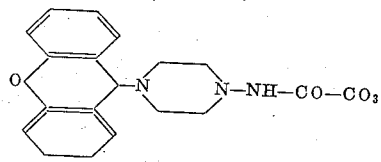

If an equivalent quantity of propionic anhydride is substituted for the acetic anhydride and the above procedure is repeated, the product obtained is 1-propionamido-4-(9-xanthenyl)piperazine.

Example 2

To a stirred suspension of 5 parts of 1-amino-4-(9-xanthenyl)piperazine and 8 parts of potassium carbonate in 100 parts of chloroform there is added, portionwise, 5 parts of cyclohexanecarbonyl chloride. The mixture is stirred for an additional hour and then washed with water. The solvent is then evaporated from the solution under reduced pressure to leave a residual solid which is recrystallized from a mixture of chloroform and ether to give 1 - cyclohexanecarboxamido - 4 - (9-xanthenyl)piperazine melting at about 220–225° C.

Example 3

To a solution of 3 parts of 1-amino-4-(9-xanthenyl)-piperazine in 120 parts of chloroform there is added 10 parts of triethylamine. Then a solution of 3 parts of benzoyl chloride in 30 parts of chloroform is added portionwise with stirring. A precipitate forms. This is separated by filtration and then dissolved in chloroform. Ether is added to the solution which is then allowed to stand. The solid which forms is separated by filtration to give 1-benzamido-4-(9-xanthenyl)piperazine melting at about 258–259° C. This compound has the following formula

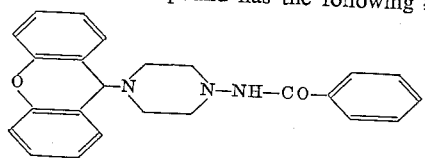

Example 4

A solution of 5 parts of 1-amino-4-(9-thioxanthenyl)piperazine and 3 parts of isatoic anhydride in 90 parts of tetrahydrofuran is refluxed for 3 hours. The solvent is then evaporated from the solution under reduced pressure to leave a residual solid. Ether is added to this residue and the solid is collected by filtration and recrystallized from a mixture of tetrahydrofuran and ether to give 1-(2-aminophenyl)-4-(9-thioxanthenyl)piperazine melting at about 234–235° C.

Example 5

Other compounds which may be prepared according to the procedure of Example 3 by selecting the appropriate starting materials are, for example, 1-(3-trifluoromethylbenzamido)-4-(9-xanthenyl)piperazine melting at about 250–251° C., 1-(4-methylbenzamido)-4-(9-xanthenyl)piperazine, 1-(4-chlorobenzamido)-4-(9-xanthenyl)piperazine, 1-(3-fluorobenzamido)-4-(9-xanthenyl)-piperazine, 1-(4-bromobenzamido)-4-(9-xanthenyl)piperazine, 1-(4-methoxybenzamido) - 4 - (9-xanthenyl)piperazine, 1 - benzamido - 4-(2-chloro-9-xanthenyl)piperazine, and 1-benzamido-4-(4-methyl-9-xanthenyl)piperazine.

What is claimed is:
1. A compound of the formula

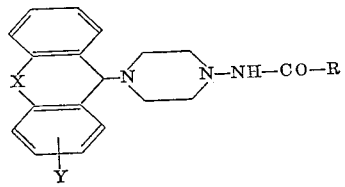

wherein X selected from the group consisting of O and S; Y is selected from the group consisting of hydrogen, chlorine, and methyl; and R is selected from the group consisting of lower alkyl, cyclohexyl, phenyl, tolyl, halophenyl, methoxyphenyl, trifluoromethylphenyl, and aminophenyl.

2. A compound according to claim 1 which has the formula

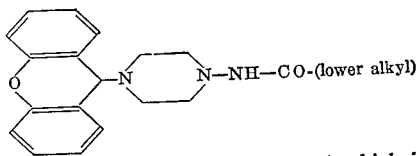

3. A compound according to claim 1 which is 1-acetamido-4-(9-xanthenyl)piperazine.
4. A compound according to claim 1 which is 1-cyclohexanecarboxamido-4-(9-xanthenyl)piperazine.
5. A compound according to claim 1 which is 1-benzamido-4-(9-xanthenyl)piperazine.
6. A compound according to claim 1 which is 1-(3-trifluoromethylbenzamido)-4-(9-xanthenyl)piperazine.

References Cited

UNITED STATES PATENTS 3,159,636   12/1964   Yonan et al. -------- 260—268

HENRY R. JILES, *Primary Examiner.*

UNITED STATES PATENT OFFICE
CERTIFICATE OF CORRECTION

Patent No. 3,350,402            October 31, 1967

John W. Cusic et al.

It is hereby certified that error appears in the above numbered patent requiring correction and that the said Letters Patent should read as corrected below.

Column 2, lines 6 to 12, for that portion of the formula reading "-NH-CO-CO$_3$" read -- -NH-CO-CH$_3$ --.

Signed and sealed this 25th day of February 1969.

(SEAL)
Attest:

Edward M. Fletcher, Jr.
Attesting Officer

EDWARD J. BRENNER
Commissioner of Patents